US005820172A

United States Patent [19]
Brigham et al.

[11] Patent Number: 5,820,172
[45] Date of Patent: Oct. 13, 1998

[54] METHOD FOR CONTROLLING ENERGY FLOW IN A HYBRID ELECTRIC VEHICLE

[75] Inventors: David Richens Brigham, Ann Arbor; Sandra Giardini, Dearborn; Amos Lev, Southfield; Timothy Romlein, Ann Arbor, all of Mich.; Michael Alan Tamor, Toledo, Ohio

[73] Assignee: Ford Global Technologies, Inc., Dearborn, Mich.

[21] Appl. No.: 807,100

[22] Filed: Feb. 27, 1997

[51] Int. Cl.[6] .................................................... H02P 9/04
[52] U.S. Cl. ........................... 290/40 C; 290/16; 290/27; 318/143; 180/65.4; 322/16
[58] Field of Search ................................. 290/11, 16, 27, 290/40 C; 318/139, 143; 322/14, 15, 16; 180/65.1, 65.2, 65.4, 65.8

[56] References Cited

U.S. PATENT DOCUMENTS

| | | | |
|---|---|---|---|
| 3,566,717 | 3/1971 | Berman et al. | 74/859 |
| 3,792,327 | 2/1974 | Waldorf | 318/139 |
| 4,187,436 | 2/1980 | Etienne | 290/27 |
| 4,306,156 | 12/1981 | Monaco et al. | 290/17 |
| 4,313,080 | 1/1982 | Park | 320/61 |
| 4,335,429 | 6/1982 | Kawakatsu | 364/424 |
| 4,407,132 | 10/1983 | Kawakatsu et al. | 60/716 |
| 4,444,285 | 4/1984 | Stewart et al. | 180/65.4 |
| 5,081,365 | 1/1992 | Field et al. | 290/45 |
| 5,176,213 | 1/1993 | Kawai et al. | 180/243 |
| 5,264,764 | 11/1993 | Kuang | 318/139 |
| 5,343,970 | 9/1994 | Severinsky | 180/65.2 |
| 5,359,228 | 10/1994 | Yoshida | 290/17 |
| 5,359,308 | 10/1994 | Sun et al. | 335/216 |
| 5,428,274 | 6/1995 | Furutani et al. | 318/139 |
| 5,545,928 | 8/1996 | Kotani | 290/40 C |
| 5,550,445 | 8/1996 | Nii | 318/153 |
| 5,588,498 | 12/1996 | Kitada | 180/65.4 |
| 5,621,304 | 4/1997 | Kiuchi et al. | 322/18 |
| 5,650,931 | 7/1997 | Nii | 364/424.026 |
| 5,656,921 | 8/1997 | Farrall | 322/40 |
| 5,698,955 | 12/1997 | Nii | 318/139 |
| 5,722,911 | 3/1998 | Ibaraki et al. | 477/3 |
| 5,751,137 | 5/1998 | Kiuchi et al. | 322/14 |

OTHER PUBLICATIONS

A Kalberiah, Electric Hybrid Drive Systems For Passenger Cars And Taxis, Volkswagen AG, Wolfsburg, Germany, Nov. 1992, pp. 69–77.

W B Lawrence, C V Naylor, T L Pryor and S J Phillips, Microprocessor Control Of a hybrid Energy System, Proceedings o f the 24th Intersociety Energy Conversion Engineering Conference, IEEE, Aug. 1989, pp. 737–741.

J R Bumby and I Forster, Optimisation and Control Of a Hybrid Electric car, IEEE Proceedings, V. 134, Pt. D, No. 6, Nov. 1987.

*Primary Examiner*—Steven L. Stephan
*Assistant Examiner*—Nicholas Ponomarenko
*Attorney, Agent, or Firm*—Roger L. May; Mark S. Sparschu

[57] ABSTRACT

An operating strategy for a hybrid electric vehicle (HEV) manages the flow of energy to both supply the motive demand power of the HEV and maintain the charge of the energy storage system (ESS). A controller operates the main power unit (HPU) and ESS and, using an optimal fuel cost strategy, scans all possible combinations of power from the HPU and ESS that satisfy the motive demand power. The combination with the lowest fuel cost is selected and the ESS is charged, when possible, using marginal charging; but, if the state of charge of the ESS falls below a certain level, fast charging is invoked. A minimum power threshold strategy can be used rather than the fuel cost strategy. The minimum power threshold strategy determines the optimal compromise of HPU operation and ESS operation to maximize fuel economy by using a motive power threshold below which the HPU is not operated except to recharge the ESS.

21 Claims, 10 Drawing Sheets

METHOD FOR CONTROLLING ENERGY FLOW IN A HYBRID ELECTRIC VEHICLE

FIELD OF THE INVENTION

This invention relates generally to hybrid electric vehicles, and, more particularly, to a method of controlling energy flow in a hybrid electric vehicle to satisfy motive demand for power and maintain charge of electrical energy storage system while delivering optimum fuel economy.

BACKGROUND OF THE INVENTION

A hybrid electric vehicle (HEV) is generally described as a motor vehicle with a main power unit (HPU) which converts fuel energy to electric and/or mechanical energy, and a bi-directional energy storage system (ESS), usually electrical. The main power unit may be a piston engine, gas turbine, fuel cell or the like while the energy storage system may be a battery, flywheel, capacitor or the like. Motive power to drive the vehicle, as demanded by the driver, is drawn from a combination of these two sources. The essential elements of a hybrid vehicle power train include an HPU, an electric traction motor-generator, and an energy storage system. Various hybrid configurations add HPU and ESS power in different places in the system.

Irrespective of configuration, the system operating strategy determines the rates at which energy is released from fuel in the HPU and energy drawn from the ESS to meet two constraints. The first constraint is that the demand for motive power must always satisfied up to a fixed limit, and the second constraint is that the state of charge (SOC) of the ESS is maintained within a preferred range. Within these constraints, it is highly desirable that the strategy obtain the maximum fuel economy.

SUMMARY OF THE INVENTION

The present invention is directed to overcoming one or more of the problems set forth above. Briefly summarized, according to one aspect of the present invention, a method for controlling energy flow in a hybrid electric vehicle (HEV) having a main power unit (HPU) and an onboard energy storage system (ESS) to satisfy energy demand and maintain charge in the ESS, comprises the steps of: determining motive demand power (MDP) of the vehicle; determining state of charge (SOC) of the ESS; determining fuel use rate of the HPU as a function of power, the effective fuel value of ESS energy, and the output characteristics of the ESS to determine the equivalent fuel use rate of the ESS as a function of power; scanning possible energy combinations of the HPU and ESS that satisfy MDP; determining fuel cost of each energy combination using the fuel use rates; and selecting the power combination with lowest fuel cost and decrementing the fuel value of stored energy appropriately. Where the remaining energy stored in the ESS falls below the desired minimum, and the demand power is within the capabilities of the HPU alone, the method further comprises of the steps of using the input characteristics of the ESS to determine the charging efficiency of the ESS from zero power up to the maximum of the HPU less the demand, selecting the HPU power that charges the ESS most efficiently, charging the ESS at that power by operating the HPU at a power higher than that demanded by the driver, and adding to the effective fuel value of energy stored in the ESS at a rate proportional to the HPU consumption rate reduced by the fraction of HPU output diverted to the ESS.

The operating strategy for an HEV manages the flow of energy to simultaneously satisfy motive demand and maintain the ESS charge. The fuel-cost strategy is adaptive to both the HEV drive train components and driving conditions, and thereby always results in the highest possible fuel economy.

According to another aspect of the invention, a simplified but sub-optimal method for implementing the optimal fuel cost strategy uses a single parameter to characterize the motive power threshold in a modification of a simple thermostat strategy for controlling energy flow in a hybrid electric vehicle having a main power unit (HPU) and an onboard energy storage system (ESS) to satisfy energy demand and maintain charge in the ESS. This method comprises the steps of: determining motive demand power (MDP) of the vehicle; selecting a SOC window for the ESS with an upper limit (HIGH) and a lower limit (LOW); ceasing operation of the HPU if the SOC exceeds the upper limit with it remaining off, and thus discharging the ESS, until the SOC decreases below the lower limit; and starting and operating the HPU if the SOC decreases below the lower limit with it remaining on, and thus charging the ESS, until the SOC exceeds the upper limit. When the HPU is operating, the motive demand power (MDP) is determined by averaging the instantaneous vehicle motive power over a predetermined integration time period. If the MDP is above a preselected minimum power threshold (MPT), the HPU power will equal the motive demand power. If MDP drops below the MPT, then the HPU will continue operation at the MPT power and charge the battery until upper SOC limit is exceeded which ceases operation of the HPU, or until the MDP exceeds the MPT. If the MDP exceeds a predetermined HPU output power limit, then ESS power is used to supplement the HPU power to meet the MDP requirement. If the ESS SOC decreases below a predetermined recharge SOC (VLOW), then fast recharging at a predetermined high power limit is initiated until the lower limit of the SOC control window (LOW) is reached.

This operating strategy for an HEV manages the flow of energy so as to simultaneously satisfy the motive power demand and maintain the charge in the electric energy storage system, while, at the same time, providing a simple implementable strategy with a slow and easily managed HPU cycling rate that achieves fuel economy results that approach those of the optimal fuel cost strategy. Using a single parameter, the minimum power threshold, this strategy can be used to determine the optimal compromise between the extremes of load following and load averaging that maximizes fuel economy.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
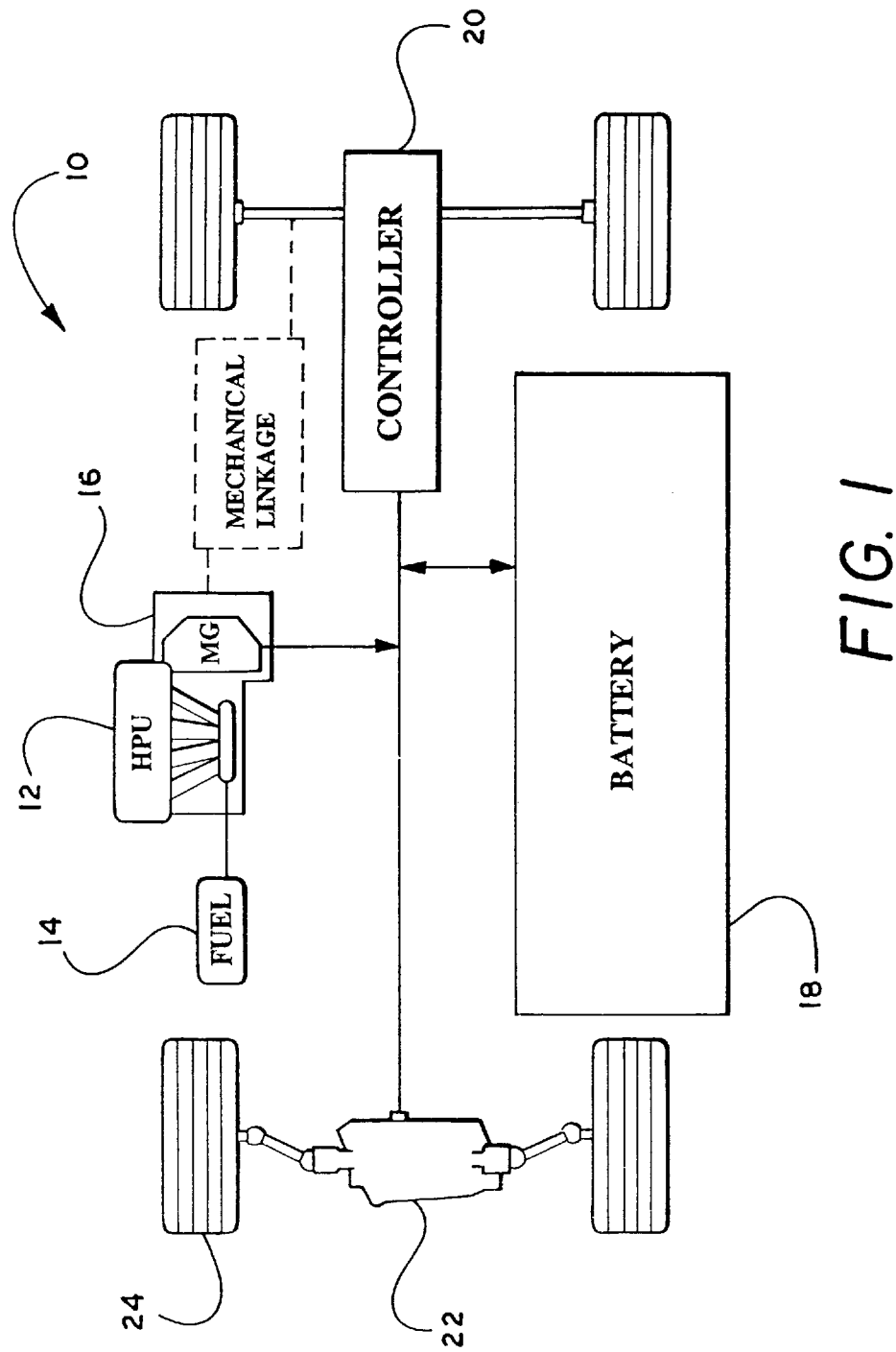
FIG. 1 a diagram illustrating components of a series configuration of a hybrid electric vehicle (HEV) with direct mechanical linkage for parallel configuration shown in dashed lines.

FIG. 1 illustrates a series hybrid electric vehicle (HEV) 10. Although applicable to all HEV configurations, the energy management strategy is most readily described in the context of a series HEV. The series hybrid electric vehicle (HEV) 10 contains a main power unit (HPU) 12 which uses fuel from an onboard fuel tank 14 to generate electricity in a motor-generator (MG) 16 to power the vehicle 10. An energy storage system (ESS), such as a battery 18, is also used to power the vehicle alone or in combination with the HPU 12. Both the HPU 12 and ESS 18 are under the control of controller 20. As illustrated, the vehicle 10 contains a motor/transaxle 22 for delivering power from the HPU and ESS to the vehicle wheels 24. The proportion of the total motive demand power (MDP) power derived from each the HPU and ESS depends upon the operational strategy method employed.

One operational strategy method is a fuel cost strategy which tracks the cost in fuel of replacing any energy drawn from the ESS under current driving conditions to optimize fuel efficiency. The fuel cost strategy is adaptive to both the characteristics of the HEV drive train components and operational conditions and automatically approaches the ultimate possible fuel economy for any drive cycle and any component combination. A simplified but sub-optimal implementation of the above operational strategy method is a minimum power threshold strategy which uses a single parameter, the minimum power threshold below which the HPU is not operated. By varying this parameter from zero to the maximum power of the HPU, strategies ranging from the simple extremes of pure load following, as if the HEV had no electric storage capability except when needed for high power boost, to load leveling, as if the HEV were an electric vehicle with an onboard recharger, are placed on a continuum, and the optimal compromise determined.

The fuel cost strategy begins with the observation that the maximum efficiency of the HPU determines the ultimate efficiency of the system. With all other components being perfect, the HPU could always be operated at its peak efficiency point and the system efficiency would be optimal in all conditions. Because real components always have finite efficiency, the goal is to manage the energy flows of the system to operate the HPU as near as possible to its maximum efficiency, when and if it is operated at all, and minimize the amount of energy that is cycled through, and thereby lost in the ESS. An ideal strategy thus seeks to use the HPU alone when it is most efficient, and otherwise use the best combination of HPU and ESS power. The second task of the strategy is to restore energy to the ESS at the most favorable rate under the most favorable conditions. The fuel cost strategy is effectively comprised of a driving strategy and a charging strategy.

In developing an optimal HEV operating strategy, a major challenge is meaningfully associating a quantity of fuel with a quantity of stored electrical energy in a way that is valid for any set of components under any driving conditions. The fuel cost strategy provides a rigorous definition by tracking the fuel consumed in the process of charging the ESS. Thus, the ESS is described by two parameters, its state of charge (SOC), and the fuel value of the SOC (VSOC). The ratio of these two parameters, SOC/VSOC is equivalent to an efficiency which at various times can be significantly greater or less than that of the HPU itself. In effect, the fuel cost strategy uses the ESS as a memory. The time span of that memory is proportional to the capacity of the ESS, but inverse to the rates at which energy is withdrawn and restored. The memory time is the time to turn over the energy in the ESS. The larger the ESS, the more slowly it will respond to changes in driving conditions.

The fuel cost strategy scans all possible combinations of power from the HPU and ESS that add to satisfy the motive demand power (MDP). The fuel cost of each combination is simply the sum of the direct fuel use rate in the HPU (inverse to its efficiency) and the equivalent fuel use rate of energy from the ESS. The latter is the fuel cost of the stored energy divided by the discharge efficiency of the ESS. Three or more power sources can be handled in the same manner. The combination with the lowest fuel cost is then selected. When the SOC of the ESS is below the charging threshold, the charge strategy is invoked. However, if the best combination of HPU and ES power dictates that both HPU and ESS power must be combined to meet the demand, charging is postponed and the drive strategy is used. The demand power must be met and it is not possible to simultaneously charge and discharge the ESS. When excess HPU power is available, the charging efficiency using HPU power in excess of MDP is evaluated for all HPU powers up to its maximum output, and the HPU power resulting in the most efficient charging is selected. This is referred to as marginal charging.

It is possible that under extreme circumstances marginal charging is not sufficient to sustain the ESS charge, and the SOC will continue to fall. In this case, charging at a higher rate, albeit with lower efficiency, is authorized. This fast charging rate is chosen to have the same efficiency as would be obtained if MDP were zero and the vehicle were charging at rest. This fast charging rate strategy is not optimal. Simulations have shown that optimal marginal charging strategy is generally sufficient and that fast charging is required only rarely, if at all. When the SOC reaches a satisfactory threshold, the charging strategy is suspended and the driving strategy invoked. It is important that this upper threshold not be the entire capacity of the ESS because some capacity must be available to capture regenerated energy captured from braking.

A question arises as to whether there is fundamental justification for using the actual ESS capacity, or whether the choice is actually arbitrary and a virtual ESS of greater or lesser capacity (longer or shorter memory) would lead to superior performance. Tests have demonstrated that ESS size above the minimum required to complete the drive cycles has very little effect on fuel consumption.

Charging from the HPU and charging from regenerated braking energy are two ways by which energy is stored in the ESS. A fuel cost must be assigned to the regenerated energy. It might be called free energy as it is a windfall, however, operational decisions must be based not on the cost of energy, but rather on the cost of replacing energy, and regeneration cannot be predicted. In a frictionless world, energy could be stored in the kinetic energy of the vehicle as readily as in the ESS. The fuel cost of storing that kinetic energy depends on the conditions under which the vehicle was accelerated. This could actually be computed but would have little meaning because of the very rapid loss of kinetic energy to friction, equivalent to a badly leaking ESS. Including friction losses tends to make regenerated energy appear very costly in fuel and thereby discourages its use. It is therefore desirable to price it as cheaply as is physically reasonable. Obviously, the cost is not less than that incurred if the kinetic energy was stored in vehicle motion with the HPU operating at its maximum efficiency. If the charge balance requirement must include regeneration, then regeneration cost effect is eliminated. The fuel value of regenerated energy is used for defining the driving strategy only. By making sure that the SOC is the same before and after the simulated drive, it does not distort the fuel economy estimate. For some combinations of HPU and ESS characteristics, it is necessary to further cheapen regenerated energy in order to guarantee its reuse.

The driving strategy divides the span of motive powers into a low power electric only range, a medium power HPU only load following domain, and a high power summing domain using both HPU and ESS power. The thresholds dividing these three domains are continuously adjusted in response to the fuel cost of stored energy which varies with the efficiencies of the system components, the amount of regenerated braking energy captured, and the efficiency associated with the available charging opportunities under current driving conditions. Assuming that driving conditions in the near future will resemble those in the recent past, the fuel cost strategy is always optimal.

Figure 2:
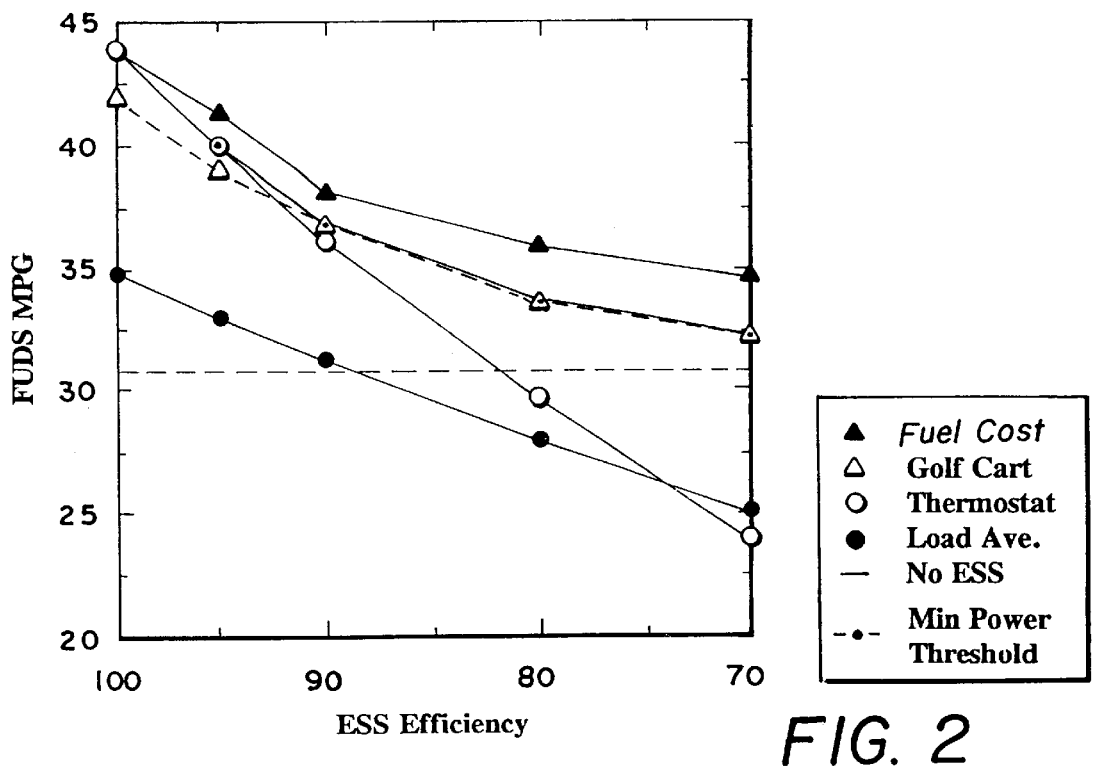
FIG. 2 is a graph comparing fuel economy and efficiency for several HEV operating strategies.

FIG. 2 compares the fuel cost strategy to other HEV operating strategies in urban driving. In its purest form the fuel cost strategy may call for impossibly frequent restarts of the HPU. An average on-time of ten seconds is not untypical for city driving. Minor modifications of the strategy can reduce this cycling frequency to acceptable levels without compromising the underlying principles and only a small degradation in efficiency. One simple modification is the so-called "golf cart" strategy in which the drive strategy is used until the HPU is turned on. The HPU is left on, charging the ESS if necessary, until next the vehicle comes to rest or decelerates, and only then allowed to shut off. This increases the typical cycle time to an acceptable two minutes with only a small sacrifice in economy. Other variations are possible, such as shutting off the HPU when next the demand power falls to zero such as in coasting and braking.

Because it is used only as a criterion for system operational decisions, the value of the energy stored in the ESS may be made to reflect other costs in addition to that of fuel itself. Examples of such costs include emissions and degradation of components with finite life. By replacing simple fuel cost with a weighted sum of other costs, the optimizing strategy will find the operational mode which minimizes this new net cost. With some penalty in fuel economy, this will bias the system against usage of operating modes that incur these new costs, but does not expressly prevent using those modes when absolutely necessary. By increasing the relative weight of the nonfuel costs, the cost in fuel economy of reducing other costs, such as emissions, can be evaluated. Other costs, such as emissions constituents, can be weighted against each other as well. This multi-component cost minimization approach can be used both for vehicle operation and for system design. In the latter, the interactions between fuel economy, emissions, vehicle weight and dollar cost can be evaluated on an even footing. For example, by minimizing operation in the mode which produces a particular emissions component, the cost of the required after treatment may be reduced accordingly.

Figure 3:
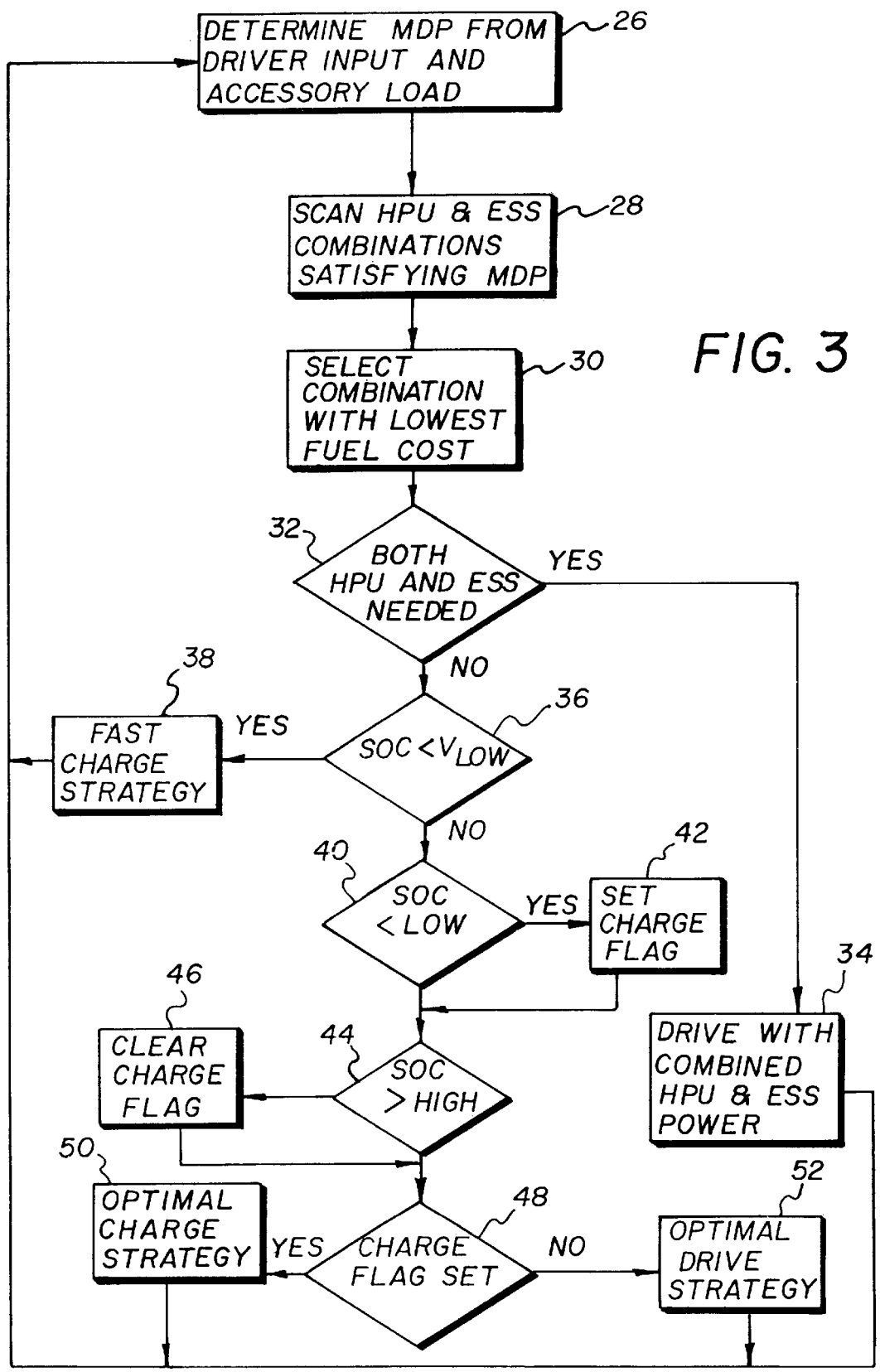
FIG. 3 is a flow chart illustrating the fuel cost operating strategy of an HEV.

The flowchart of FIG. 3 illustrates the energy cost operational strategy method. At block 26 motive demand power (MDP) is determined from driver inputs and accessory loads. At block 28 the controller 20 scans HPU and ESS combinations that satisfy MDP, then at block 30 the combination with lowest fuel cost is selected. At decision block 32 it is determined whether both the HPU and ESS are needed to satisfy motive demand power. When both are required to satisfy MDP, then at block 34 driving is continued using both the HPU and ESS, and the process continues at block 26 by again determining MDP.

When both the HPU and ESS are not required to meet MDP, there is an opportunity to recharge the ESS if desired and an opportunity to use an optimal drive strategy. At decision block 36 the state of charge (SOC) of the ESS relative to a very low limit, VLOW, is determined. When SOC falls below VLOW at block 36, then fast rate charging of the ESS is initiated at block 38. Fast rate charging is not optimal but does quickly restore ESS charge and allows smaller ESS sizes and HPU sizes to be used. When SOC is not below VLOW at block 36, then at block 40 it is determined whether the SOC is below a lower limit, LOW. If so, then a charge flag is set at block 42 and the ESS can recharge. If not, then at block 44 a query is made as to whether SOC is greater than an upper limit, HIGH. If SOC is greater than HIGH at block 44, then at block 46 the charge flag is cleared to stop recharging. If SOC is not greater than HIGH at block 44, then at block 48 a query is made whether the charge flag is set. If the charge flag is set at block 48, then at block 50 an optimal charging strategy is used to recharge the ESS. If the charge flag is not set at block 48, then at block 52 an optimal drive strategy is used. From blocks 50 and 52 the process continues at block 26 where MDP is determined.

In the fuel cost mode of operation, the combination of HPU and ESS power with the lowest fuel cost is chosen to operate the vehicle. IF the SOC of the ESS falls below the very low limit, then the ESS is charged at a high rate. If the SOC is above the lower limit and both the HPU and ESS are not needed to meet motive demand power, then optimal marginal charging is used. When both the HPU and ESS are needed to operate the vehicle, charging is postponed.

In the fuel cost strategy, all decisions on when and where to store or release energy are based on the fuel cost of that energy. The strategy embodies several guiding principles including propelling the vehicle with the cheapest (in fuel) energy available, charging the ESS with the cheapest energy available, and avoiding starting the HPU. It is desirable to start the HPU only when required to propel the vehicle in the most economical fashion or when the SOC of the ESS is below some critical value.

To abide by these guiding principles, the cost in fuel of the energy in the ESS is continuously tracked. This is called the fuel value (VSOC) of the stored energy. The unit cost of the stored energy is given by VSOC/SOC and is called fuel cost (CSOC), or simply the cost of stored energy. While driving, the mix of HPU and ESS power satisfying the motive demand power (MDP) is adjusted to minimize fuel cost. The drive strategy directs the mixture of power sources to satisfy the motive power demand at the least fuel cost. The demand power, MDP, is satisfied by summing HPU power, $P_H$, and ESS power, $P_E$. The proper mixture is found by minimizing the cost function:

$$C(P_D) = CSOC \frac{P_E}{\epsilon_{ED}(P_E, SOC)} + \frac{P_H}{\epsilon_H(P_H)},$$

where $\Sigma_{ED}(P_E, SOC)$ and $\Sigma_H(P_H)$ are the efficiencies of the ESS and HPU, respectively, and $P_E + P_H = MDP$. This minimization may be described as the solution to a differential equation, however, it is computationally faster to simply sample the range of possible combinations in suitably small intervals and choose the combination leading to the lowest cost. With the instantaneous fuel value of stored energy known, the drive strategy can be represented as a function varying from zero to one indicating the fraction of demand power optimally delivered from stored energy. The remainder to be delivered from the HPU.

When the SOC is below some threshold and the opportunity arises, the ESS is charged at a rate that minimizes the fuel cost of the stored energy. If absolutely necessary, the ESS can be charged at a higher rate, which will in turn raise the cost of the stored energy. All component and turnaround efficiencies are automatically included.

As the quality and necessity of charging opportunities varies with driving conditions, the cost of the stored energy will rise and discourage, or fall and encourage its use. In this way the cost based strategy is both optimal and adaptive; the SOC and VSOC acts both as a memory of recent conditions and as a predictor of near future conditions. The time span of this memory is inverse to the turnover rate of energy in the ESS and increases linearly with ESS capacity. The time span is short in urban driving and long during highway driving. Assuming that the statistical nature of driving conditions will not change within the near future (near meaning within the time span of the ESS memory) the values of SOC and VSOC are a valid predictor of those conditions; that is, the optimization achieved during a given time period is valid in the next time period.

Figure 5:
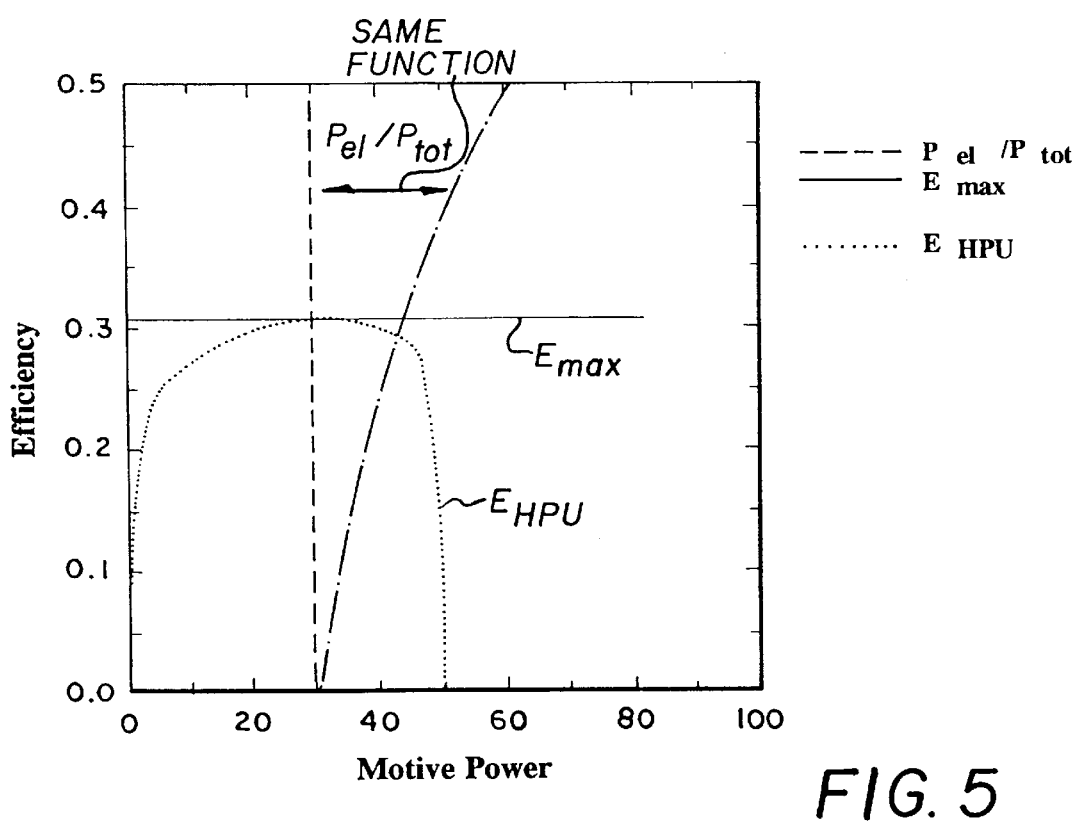
FIGS. 5 is a graph showing HPU and ESS efficiency, the best combination of HPU and ESS power, and the efficiency of that combination as a function of motive demand power for a perfect ESS.

With the assumption that all energy must be derived from fuel, the ideal of maximum efficiency is achieved when the system efficiency is equal to the maximum HPU efficiency at all demand powers. As an example, the solid line in FIG. 5 shows the fuel efficiency as a function of demand power for a combination of a 50 kW series HPU (IC engine/alternator combination) and the perfect (100% efficient, infinite power) ESS. Superposed are the HPU and ESS efficiencies and the drive strategy function. (In the region where the latter is off scale it has a value of 1.) In this case there are only two regimes. Up to 30 kW, the efficiency peak of the HPU, it is most efficient to drive with ESS power only. Above an abrupt threshold, called the motive power threshold ($P_{MT}$), the HPU power is held constant at this peak power and any additional demand power is drawn form the ESS. It is trivial that the perfect ESS will permit load leveling that allows operation of the HPU at its maximum efficiency only.

Figure 6:
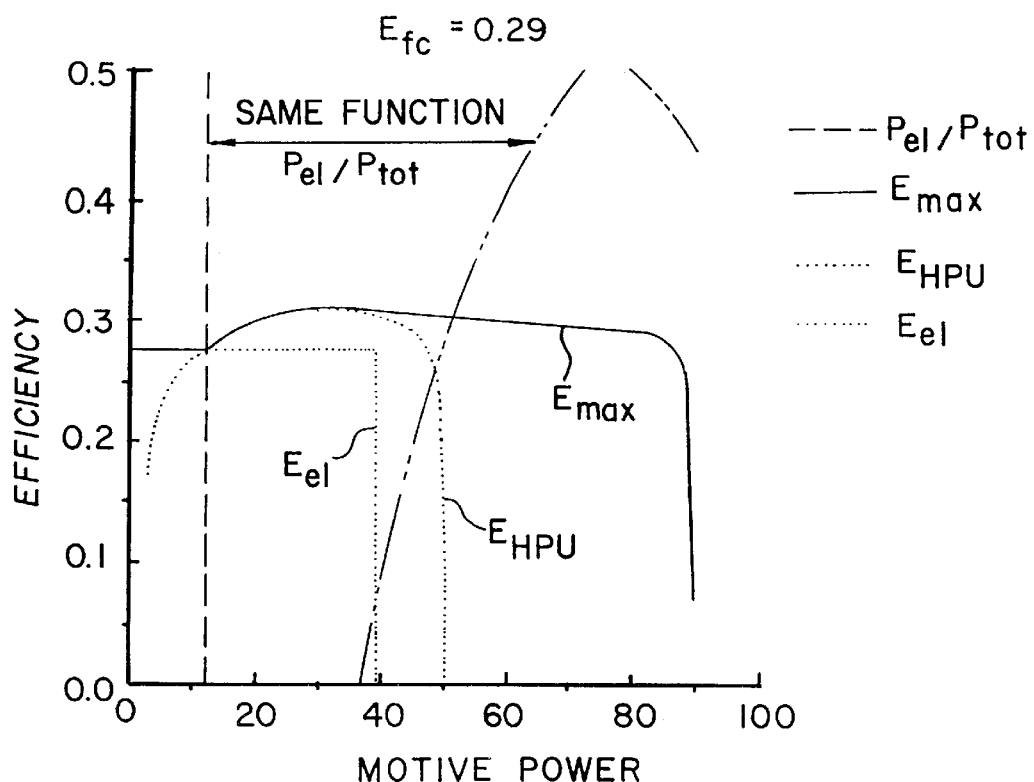
FIGS. 6 is a graph showing HPU and ESS efficiency, the best combination of HPU and ESS power, and the efficiency of that combination as a function of motive demand power for an ESS of fixed 90% efficiency.
Figure 7:
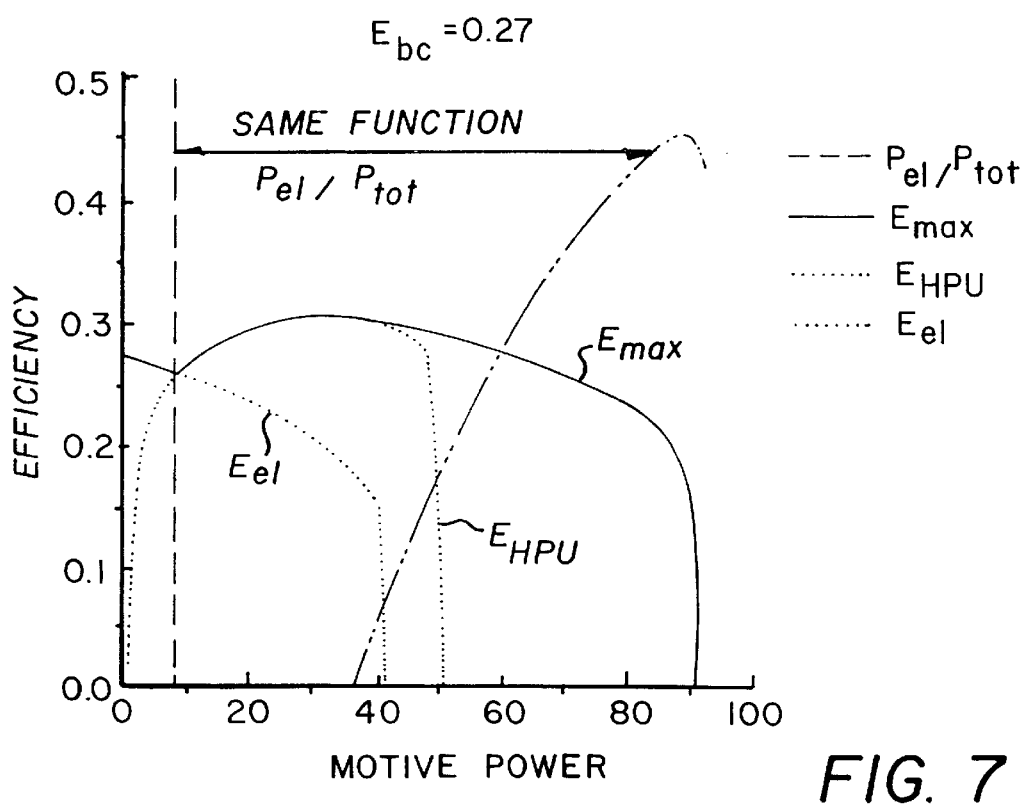
FIGS. 7 is a graph showing HPU and ESS efficiency, the best combination of HPU and ESS power, and the efficiency of that combination as a function of motive demand power for an ideal 40 kW battery.

FIGS. 6 and 7 show drive strategies for more realistic cases. In FIG. 6, the 50 kW HPU is coupled to an idealized 40 kW flywheel (constant 95% efficiency), and in FIG. 7 the same HPU is coupled with an ideal 40 kW battery. These were computed with the ESS charging efficiency set to that obtained at zero demand power. They exhibit three regimes. Up to some threshold power, it is most efficient to drive with ESS power only. Above this lower motive power threshold ($P_{ML}$) it is most efficient to use HPU power only until the high motive power threshold ($P_{MH}$) for mixed driving is reached. Above ($P_{MH}$) a growing fraction of the demand power is drawn from the ESS.

Two characteristics of the drive strategy in FIGS. 6 and 7 are noteworthy. First, the mixed power threshold is well below the maximum output of the HPU and very near the maximum of its efficiency. This is counter to the intuitive expectation that supplemental ESS power would not be desirable until the HPU efficiency fell below the maximum ESS efficiency. This effect can be understood by consideration of the marginal and average costs of increasing incremental power. Below the peak HPU efficiency the cost of both the additional power and the average cost of the initial power decrease. However, at the peak of HPU efficiency, additional output makes all the output more expensive. Thus it quickly becomes cheaper to draw small amounts of additional power from the markedly less efficient ESS in order to hold the HPU near its maximum efficiency. Second, it is clear that the lower power threshold, $P_{ML}$, is quite sensitive to CSOC, while the high power threshold, $P_{MH}$, is much less sensitive for he reasons just described.

Although the strategies for the idealized flywheel and battery are outwardly similar, they differ in some important details. First note that efficiencies at zero demand power are the same; the discharge efficiency advantage of the battery at low power is cancelled out by the lower charging efficiency at the optimal charging rate with that HPU. The flat efficiency curve of the flywheel translates to a higher $P_{ML}$ and slightly higher efficiency in the low power regime. The value of $P_{MH}$ is also the same for both ESS types—the peak of the HPU efficiency. However, the decreasing discharge efficiency of the battery makes high power driving with the flywheel more efficient. This would make the flywheel seem a better choice, however, it is possible to charge the battery more cheaply while driving, raising its efficiency above that of the flywheel both below $P_{ML}$ and just above $P_{MH}$. At high powers the flywheel will again be superior. It is already apparent that the determination of which is better depends on the spectrum of power usage and can only be made in the context of some sort of optimal strategy which takes into account the cost of ESS energy and how components of various characteristics interact.

The charge strategy consists of the choice of when to transfer energy from the HPU (fuel) to the ESS, and, having made that choice, at what rate to transfer energy. At a given demand power the charging efficiency is given by $$\Sigma_C(MDP, P_C, SOC) = \Sigma_H(MDP + P_C) \times \Sigma_{EC}(P_C, SOC).$$

Figure 8:
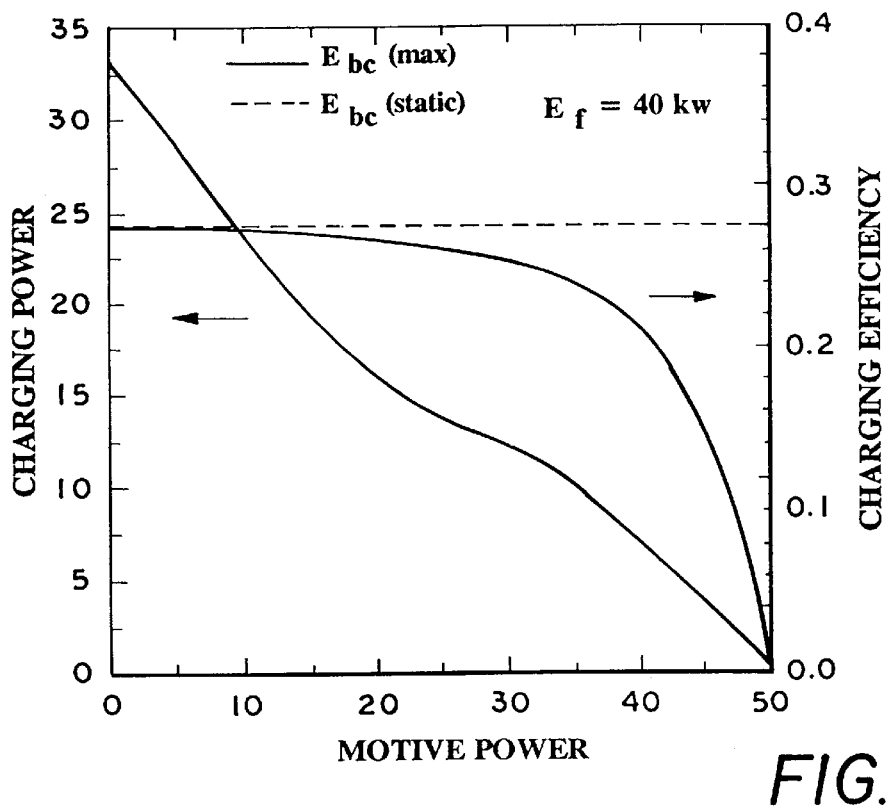
FIG. 8 illustrates optimal charging power for the same HPU-ESS combinations as FIG. 6.
Figure 9:
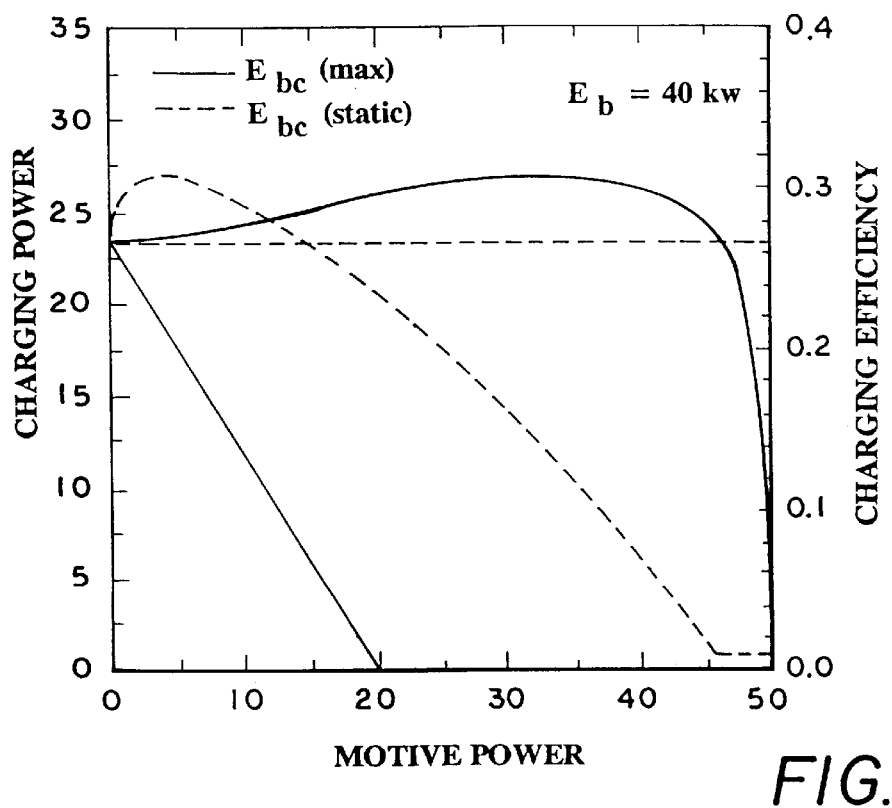
FIG. 9 illustrates optimal charging power for the same HPU-ESS combinations as FIG. 7.

The cost of stored energy is minimized when $\Sigma_{EC}$ is maximized. This describes the optimal charge storage strategy. Were the ESS efficiency constant, charging efficiency would always be maximized with the HPU running at its own maximum efficiency ($P_{Hopt}$) and $P_{Copt}$ would always be $P_{Hopt}$—MDP. The real charge storage strategy is sensitive to the characteristics of the ESS. FIGS. 8 and 9 show the optimal charging power for the same HPU-ESS combinations of FIGS. 6 and 7. Because the flywheel remains efficient at high power, it is most efficient to charge it at the lesser of its maximum power and $P_{Hopt}$. At zero motive power the charge rate is very high, and the efficiency slightly higher than that for the battery. There are ample opportunities for efficient charging along the full range of motive power, with the charging efficiency remaining largely constant. For the battery, $\Sigma_{EC}$ decreases with the $P_C$, marginal charging by running the HPU above the demand power is more efficient than charging at rest. The charging efficiency (the dotted curve) increases with demand power until the limits of the HPU are approached. However, the charge rate at these higher efficiencies is quite small. The benchmark charge efficiency, that obtained while charging at idle, is the least efficient in this case. The dashed curve shows the charging rate available for marginal charging while driving that would result in the same efficiency as that achieved at zero demand power. This exceeds the optimal charging rate and remains significant up to very high power. Clearly, there are ample opportunities for efficient ESS charging over a wide range of demand powers.

While the charge storage strategy can be defined analytically, it is more difficult to define the charge timing strategy; that is, when to charge at the predetermined optimal rate. A simple rule is to define an efficiency threshold for charging and always take advantage of charging opportunities when that efficiency is exceeded, and forgo those when it is not, except in desperate circumstances. For an ESS with monotonically decreasing or increasing efficiency, this translates to a motive power threshold for charging ($P_{MC}$) above or below which the battery will be charged. This threshold can then be adjusted so that the initial and final SOC of the ESS are equal. Although this is the rigorously correct approach, it proved difficult to implement reliably in the simulations. The implementable approach is that described earlier which approximates the single threshold efficiency as the time-average of two preselected optimal and fast charging efficiencies. Results of the computationally slow charge efficiency threshold method, unimplementable in a real vehicle, were indistinguishable from those of the fuel cost strategy. Some of these were compared to those of the single threshold approach and were found to be essentially identical. The finer details of the charge timing strategy were found to have only a very small effect on fuel consumption.

Using tables of demand power as a function of time, several drive cycles were simulated. The effects of HPU and battery size were examined. Except where noted, the maximum power output of the HPU/ESS combinations always exceeded 80 kW. Although they are treated as such, it is recognized that battery power and capacity are not independent.

Figure 4:
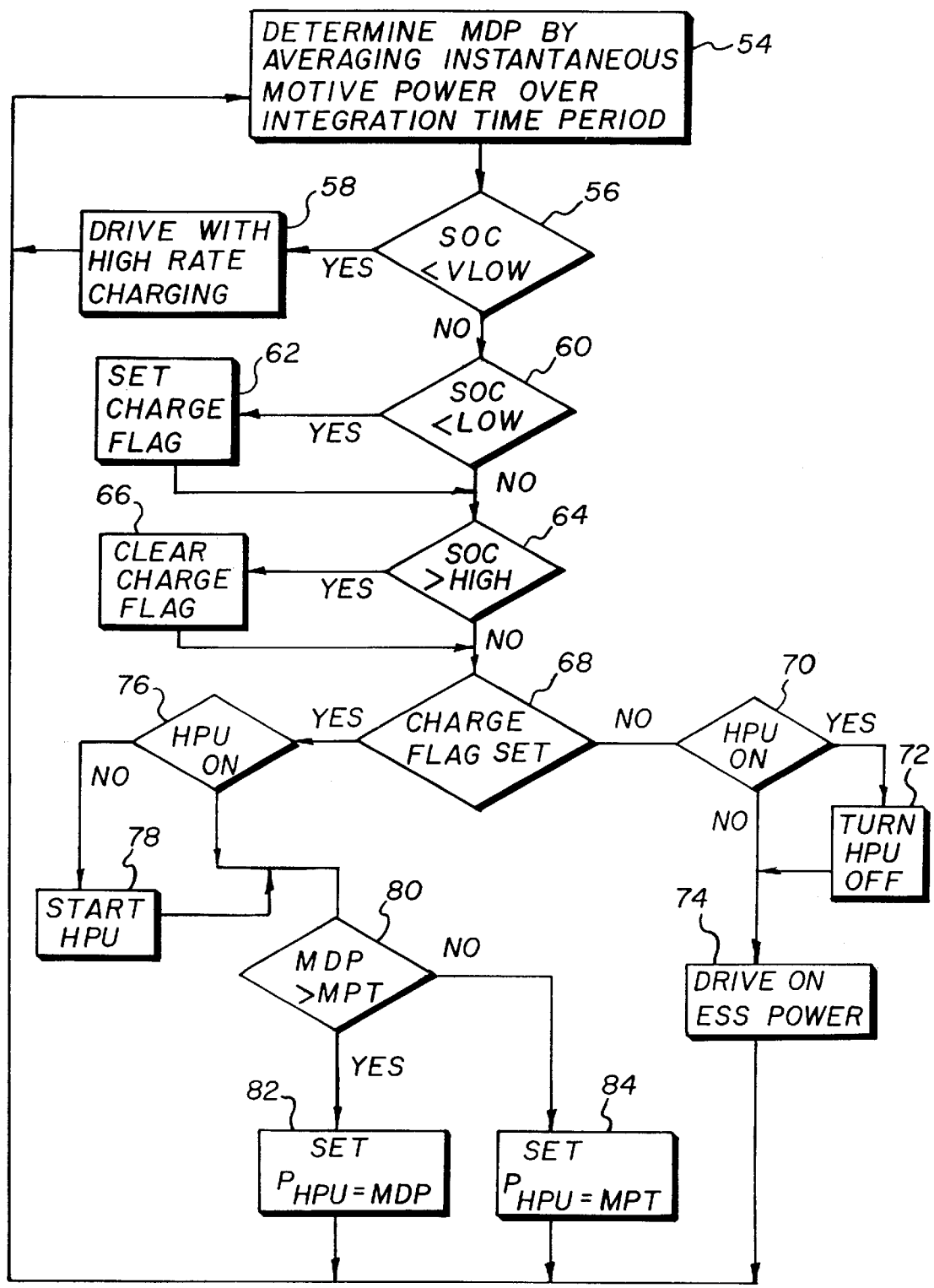
FIG. 4 is a flow chart illustrating the minimum power threshold operating strategy of an HEV.

The flow chart of FIG. 4 illustrates the minimum power threshold strategy. The motive demand power (MDP) is calculated at block 54 by averaging the instantaneous vehicle motive power over a predetermined integration time period. In the minimum power threshold mode of operation, a query is made at decision block 56 as to the state of charge (SOC) of the ESS relative to a very low limit, VLOW. When SOC is below VLOW, then at block 58 vehicle operation continues with high rate charging to quickly recharge the ESS, and MDP is again determined at block 54. If SOC is not below VLOW at block 56, then at block 60, a query is made about the SOC of the ESS relative to a low limit, LOW. When SOC is between VLOW and LOW at block 60, a charge flag is set at block 62 and the ESS can recharge. When SOC is not below VLOW at block 60, then at block 64 it is determined whether the SOC is greater than a high limit, HIGH. If SOC is greater than HIGH at block 64, then at block 66 the charge flag is cleared to stop recharging. If SOC is not greater than HIGH at block 64, then at block 68 a query is made whether the charge flag is set. When the charge flag is not set at block 68 and the HPU is on at block 70, the HPU is turned off at block 72 and the vehicle is driven on ESS power alone at block 74. When the charge flag is not set at block 66 and the HPU is off at block 70, the vehicle is driven on ESS power alone at block 74. Thus, when SOC is between LOW and HIGH, ESS charging is not required and ESS power alone can be used to meet vehicle power demand.

If the charge flag is set at block 68, then it is determined at block 76 whether the HPU is on or off. It is kept on if it is on and turned on at block 78 if is it off. At block 80 the HPU is on and a query is made as to whether the vehicle motive demand power (MDP) exceeds the predetermined minimum power threshold (MPT). If so, then at block 82 HPU power is set to equal MDP. If not, then at block 84, HPU power is set to equal MPT. After HPU power is set at block 82 or 84, MDP is again determined at block 54.

Thus, under the minimum power threshold operating strategy, the decision to turn the HPU on and off is solely based on the state of charge of the ESS which results in low cycling rates. When the HPU is on, it is operated in a mode that charges the ESS and supplies the demand power in such a way as to minimize fuel usage. The use of marginal charging, as described in the fuel cost strategy, during the load following portion of operation above when the HPU power equals the demand power would result in even further minimization of fuel usage. One very simple approximation to accomplish this would be to set the HPU power equal to the sum of the demand power and the minimum threshold power. If this sum were greater than a predefined peak HPU efficiency power (Ppkeff), then the HPU power would be set equal to Ppkeff. If the demand power were greater than PPkeff, the HPU power would be set equal to MDP as before. This minimum power threshold strategy approximates the energy cost strategy in the limit of a high power and high efficiency ESS device.

The objective of the minimum power threshold strategy is to define an optimal operating strategy within the context of a well defined and tunable HPU cycling rate. This strategy is mainly oriented towards HPU technologies with long time responses to changing power demands including restart. Like the fuel cost strategy, the minimum power threshold strategy begins with the concept of an engine power threshold below which the HPU is not operated. In order to define a controlled HPU cycling rate, however, the minimum power threshold strategy assumes an engine off operating mode and an engine on charging mode which are triggered solely by the state of charge of the ESS.

When the motive demand power is below the minimum power threshold, the HPU will continue to operate at the threshold power and charge the ESS until it reaches some upper limit on the SOC, at which point the HPU will shut down. In effect, the vehicle operates in the thermostatting mode. Demand power in excess of the threshold are supplied by the HPU up to the limits of its own output. In other words, the HPU will load follow in the range between the minimum power threshold and its maximum output. For yet higher power demand, the HPU will operate at its maximum and the shortfall drawn from the ESS. If the minimum power threshold is set to zero, the strategy becomes pure load following. If it is set to the maximum output power of the HPU, it becomes pure thermostatting. Thus this operating strategy is a synthesis of load following and thermostatting strategies that are blended together via the use of a single parameter, the minimum HPU power parameter, which finds the best compromise between these two strategy extremes that best optimizes the fuel economy subject to HPU cycling rate constraints.

It should be noted that the minimum power threshold strategy embodies one of the two elements of the more optimal fuel cost strategy. The power threshold approach implements a well developed drive strategy similar to that of the fuel cost approach. When the power threshold is set close to the lower motive power threshold defined by the fuel cost strategy, the driving behaviors are nearly identical. However, the power threshold approach does not define an equally optimized charging strategy. Thus, although, their general behaviors are quite similar, the minimum power threshold strategy does not deliver reliably optimal fuel economy.

As mentioned previously, however, marginal charging can be approximated in the minimum power threshold strategy. One very simple approximation to accomplish this is to set the HPU power equal to the sum of the demand power and the minimum threshold power. If this sum were greater than a predefined peak HPU efficiency power (Ppkeff), then the HPU power would be set equal to demand power. With this method, only one additional input parameter must be specified.

In the limit of a very efficient ESS (high power batteries), the minimum power strategy approaches the result of the fuel cost strategy due to the fact that the motive power threshold, and charging power thresholds are both close to the peak efficiency power of the HPU. In this limit, two things happen: (1) the operating strategy becomes purely electric for most HPU sizes and drive cycle power spectra of practical interest, and (2) the power window available for marginal charging is severely limited which gives rise to only small variations in the fuel cost over the drive cycle. In this limit then, the minimum power strategy approaches the results of the fuel cost algorithm, since the charging mode (engine on) and operating modes (engine off) are almost identical in the two strategies. The key difference in the two strategy options in this limit, is the fact that in the charging mode, the engine is activated according to MDP in the fuel cost strategy (with rapid cycling, but optimal fuel economy) but only at the lower ESS SOC limit in the minimum power strategy (with optimal fuel economy but slow and manageable cycling rates). The reduced fuel economy of the minimum power strategy is mainly due to three scenarios that result form the controlled cycling rate: (10 the engine is on during regeneration, (2) the engine is on and charging at idle, and (3) the engine is off during high power transients. All of these scenarios lead to reduced battery turn around efficiency and reduced fuel economy which becomes more apparent as the ESS efficiency decreases. The rough equivalence of the fuel economy results in the high efficiency limit is shown in FIG. 2.

Figure 10:
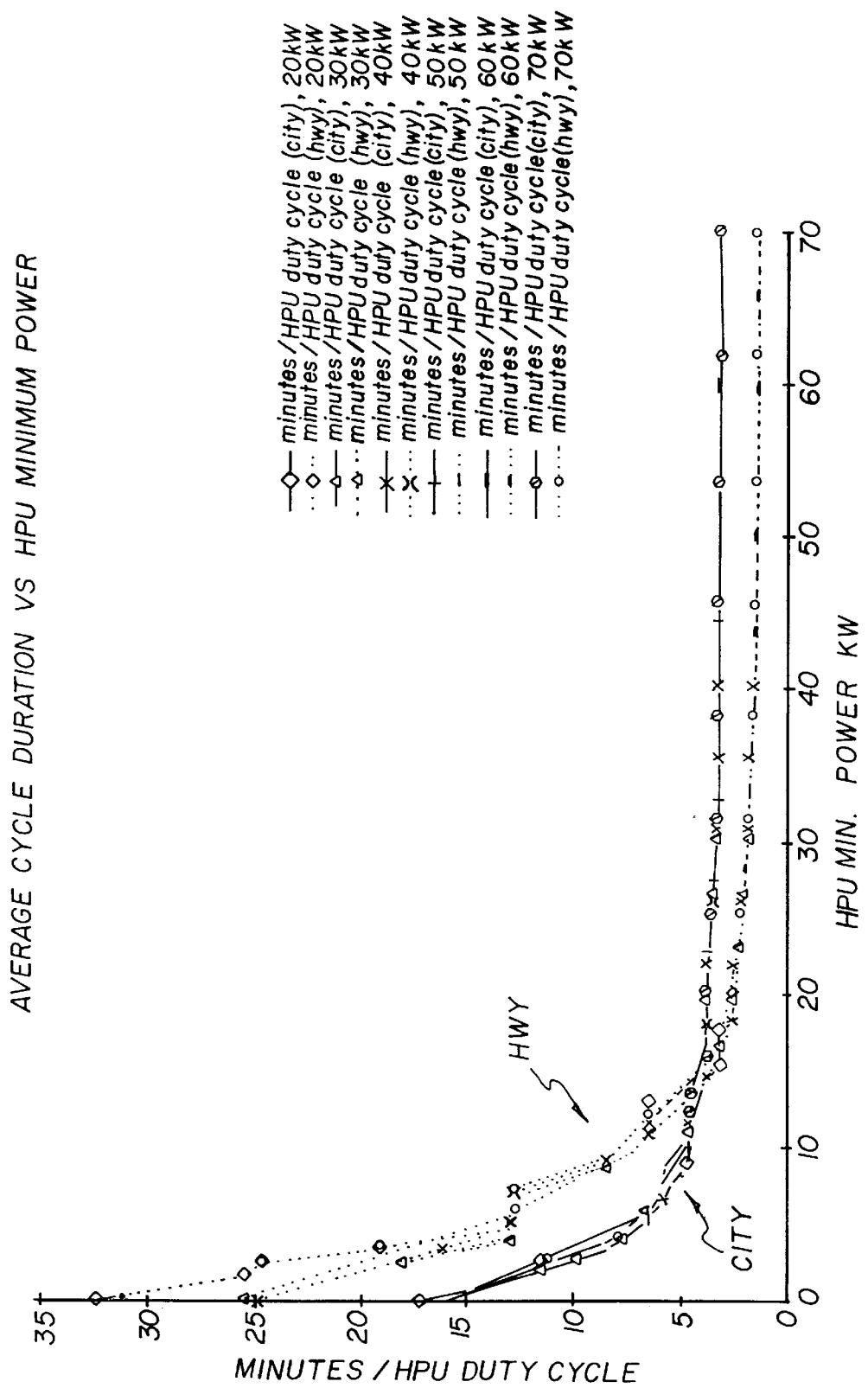
FIG. 10 illustrates city and highway average cycle duration as a function of HPU minimum power.
Figure 11:
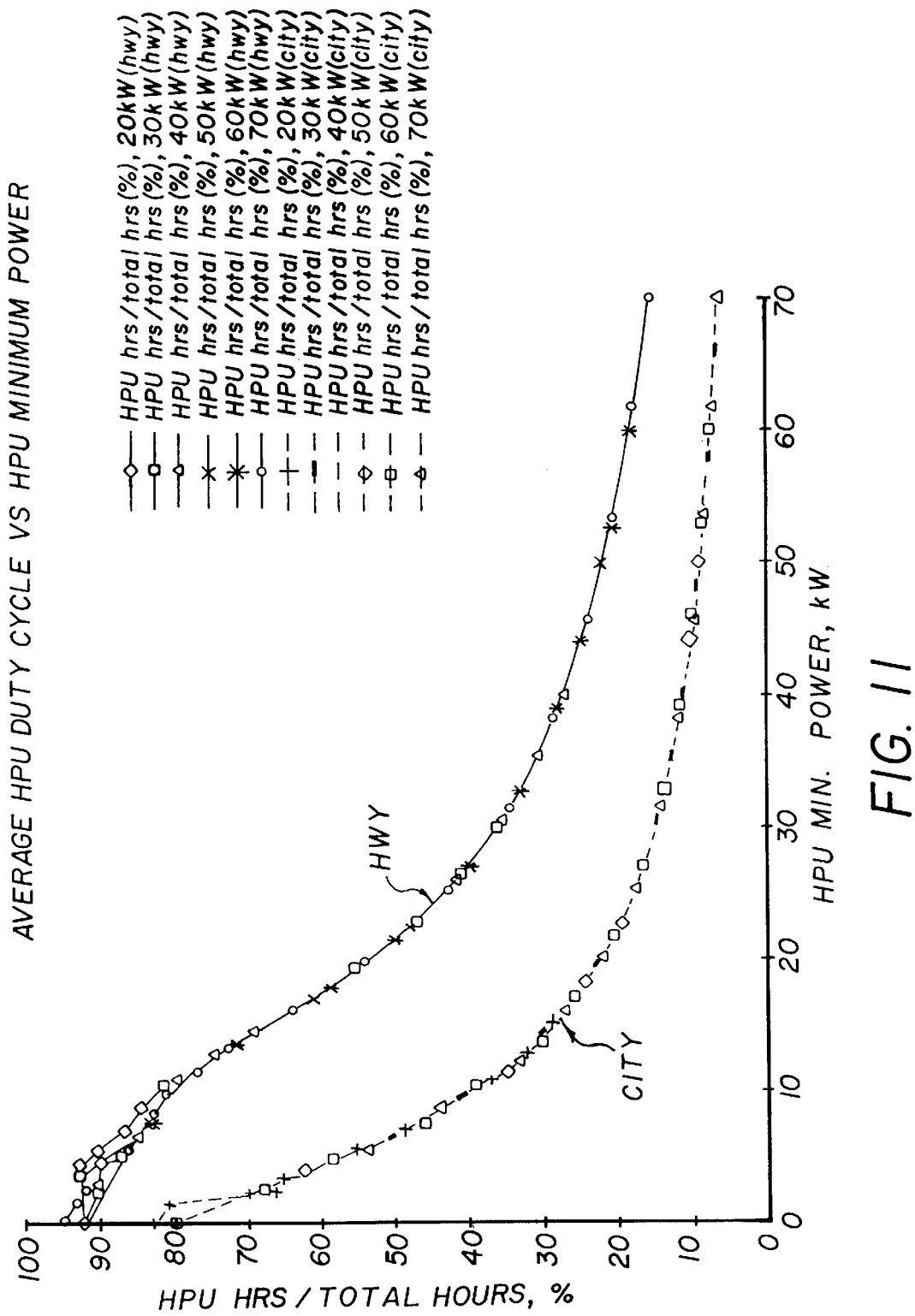
FIG. 11 illustrates city and highway duty cycle as a function of HPU minimum power.
Figure 12:
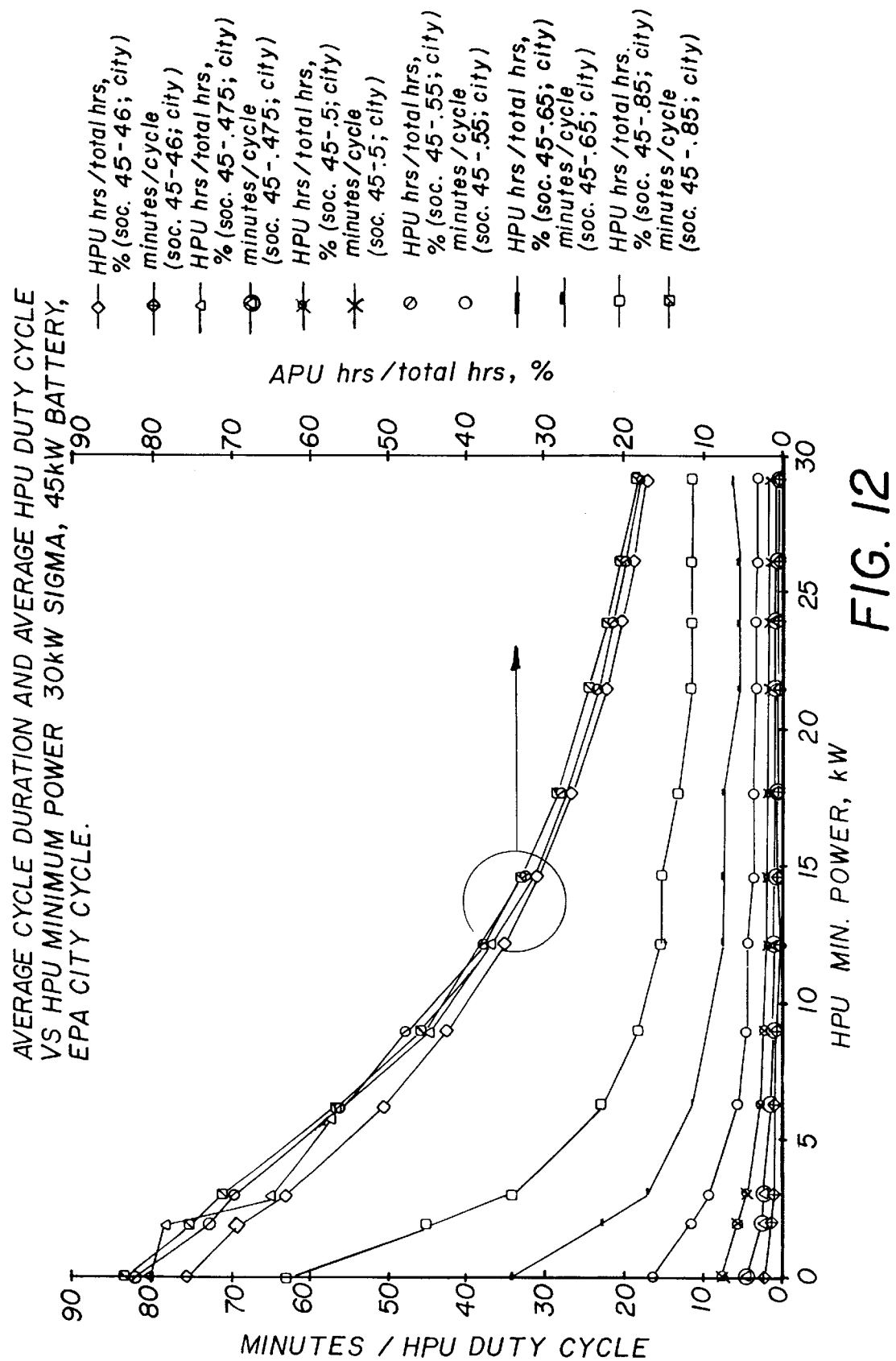
FIG. 12 illustrates average cycle duration and average HPU duty cycle as functions of HPU minimum power for various ESS SOC window sizes.

An important benefit of the minimum power strategy over the fuel cost strategy is that the HPU cycling is markedly reduced, and can be controlled in a fashion that is dictated by a combination of HPU power, minimum power threshold, and ESS window size. This effect is illustrated in FIGS. 10–12 for various minimum power and ESS combinations at a given HPU size. These figures illustrate the fact that the average engine cycling period is determined from simple vehicle, drive cycle, and strategy parameters that are independent of the specific HPU. This is due to the fact that the energy storage operating window can be viewed as a bucket that is filled at the rate of the HPU charging power (which is closely linked to the HPU minimum power strategy parameter) and (simultaneously) drained at the rate of the drive demands. For high efficiency (high power) batteries, the best fuel economy is obtained when the HPU is operated in a narrow range about its maximum efficiency point. This is the obvious goal of hybridization. However, because driving demand does not match this characteristic, the HPU will cycle very frequently.

In FIGS. 10–12, the HPU cycling period (the drive cycle determined draining time above) increases in direct proportion to the window size (the bucket above), but the HPU duty cycle is constant and independent of the window size. The HPU duty cycle does, however, decrease as the minimum HPU operating power increases, whereas the HPU cycling period is unaffected by this parameter. These effects are important in that the minimization of cycling is critical for slow restart HPUs that may incur a significant fuel penalty as well. Thus this strategy is tunable and easily implemented, and capable of accounting for variable ESS characteristics, emission constraints, and restart fuel penalties. It is also an optimal strategy for slow restart types of HPUs where engine cycling must be severely limited.

Figure 13:
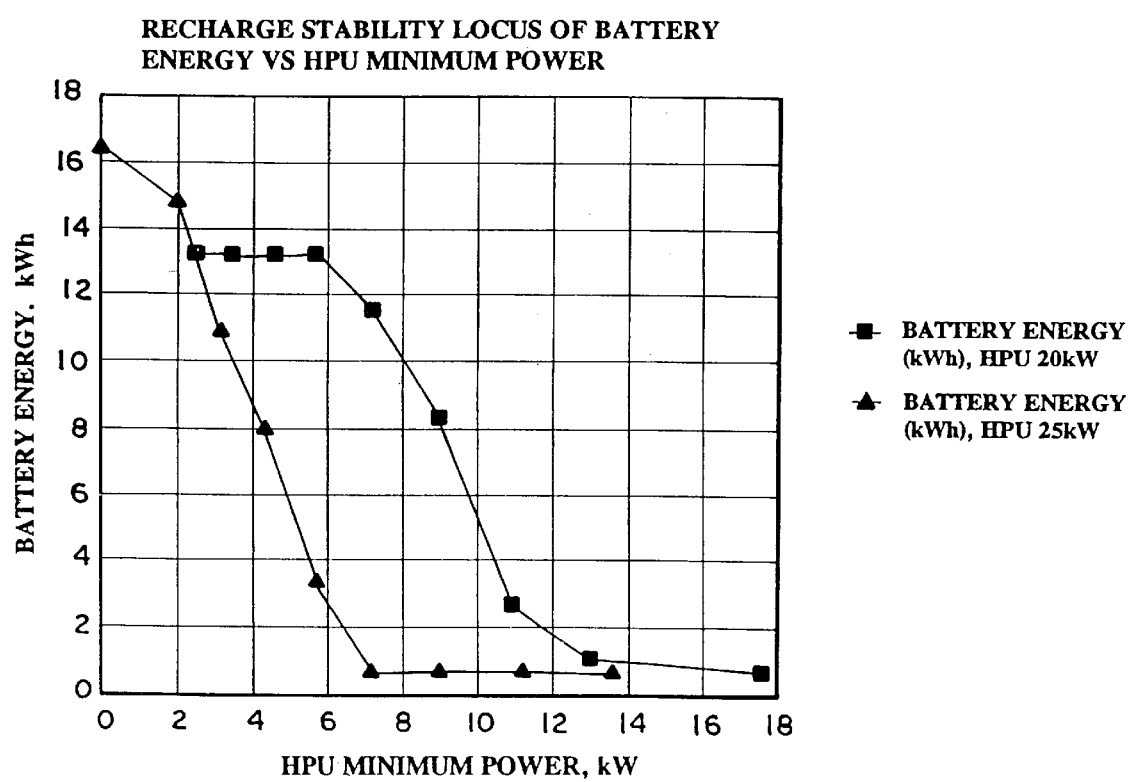
FIG. 13 is a graph of minimum battery capacity versus minimum power threshold for small HPU sizes.

In certain high demand, low regeneration, drive cycles and small HPU sizes, this strategy does not provide sufficient recharge energy due to the fact that the battery must supply the energy for all high power transients. If there are only short periods of idle in these cycles, then there is not sufficient time to recharge the battery at low minimum power thresholds, and the battery SOC decreases continuously. This effect is shown in FIG. 13 where the minimum battery capacity necessary to provide full range operation above a predetermined SOC level is plotted against the minimum power threshold for a 20 and 25 kW HPU in the high demand ATDS cycle. As can be seen this places strong constraints on the minimum storage size, or the minimum HPU threshold.

This phenomenon can be prevented by calling for HPU recharge power over and above the motive power demand whenever the energy storage SOC reaches a predefined recharge threshold. A maximum recharge power could also be specified in order to reduce turn around charging losses. If the HPU could not supply the full recharge power under high demand transients, then it would supply whatever excess power was available until the motive power demand dropped back down to a level that permitted full recharge power.

Based on experience, none of the power threshold parameters should become active in the HPU strategy until the HPU is warm in order to minimize cold high power operation. One possible operating scenario to avoid this problem would be to activate the HPU at key on for low power warm up, where the energy storage device serves as the interim power source.

Both the minimum fuel cost strategy and the minimum power threshold strategies are synthesized from three extremes of HPU operating strategies. One is full load following where the HPU output power exactly follows the motive demand power and supplemental electric power is used only when necessary. A second is load averaging, also called thermostatting or set point operation, where all demand power is drawn from the storage system until its SOC falls below some level, at which point the HPU is operated at a fixed, high efficiency point until the SOC is restored. The third is load leveling where the HPU is operated at a constant power for fixed time periods so that the energy withdrawn from the ESS in the previous period is restored during the current period. A load following vehicle may be described as a conventional vehicle with electric boost, while load averaging and load leveling vehicles are roughly equivalent to electric vehicles with onboard recharging. Neither is optimal. Load following forces operation of the HPU at low powers where it is very inefficient. In the simplest scenario thermostatting runs the HPU at peak efficiency, but cycles nearly all the drive energy through the ESS. While load averaging cycles somewhat less energy through the ESS, it is unable to assure operation of the HPU at a high efficiency point.

The three strategy alternatives discussed above can be placed on a continuum by using the following rationale. Thermostatting can be viewed as a load leveling strategy in which the engine is cycled on and off such that the average output power is equal to the average power requirement of a load leveling strategy. The load leveling and thermostatting strategies are thus identical in the limit of 100% (i.e. engine always on) duty cycle. In a similar fashion, the load following can be viewed as a load leveling strategy in which the average motive power demand is calculating over a very short time period. Thus the load following a load leveling strategies become identical in the extreme limit of long motive power averaging times (i.e. an entire drive cycle).

The three drive cycle extremes can be implemented as a continuum on a numerical basis by the introduction of three parameters:

(1) a power threshold below which the engine is not operated, (2) a motive power integration time for averaging the motive power demand, and (3) an HPU output power limit that is less than or equal to the actual engine maximum power. Using these three parameters, the three strategy options can be achieved as follows:

The load following strategy results from very small values of motive power time integration dictated by the dynamic hardware response characteristics, a power threshold value of zero, and an HPU output power limit equal to the engine maximum power.

The load leveling strategy results from very large and variable values of the motive power integration time whose upper limit is dictated by battery capacity, a power threshold value of zero, and an HPU power limit equal to the engine maximum power.

The thermostatting strategy results from very small values of motive power integration time, and variable, but equal, values of the power threshold and the HPU output power limit.

The important point is however, that both of the optimal strategies disclosed result from combinations of the three strategy options above that are not at the extremes. Conversely, the above three parameters can be applied as constraints to either of the strategies disclosed in such a way as to produce "real world" but non optimal results.

In particular, the optimal case of both the minimum fuel cost and minimum power strategies, the HPU output power limit is assumed to be equal to the engine maximum power. Both the minimum power and fuel cost strategies also assume a small motive power integration time of typically one second. These parameters could be invoked as hardware constraints however, and either strategy could be used with these constraints to produce sub-optimal results. Both strategies focus on defining a power threshold below which the engine is not operated and above which the engine operates in a quasi load following fashion. In the fuel cost strategy, this power threshold is a dynamic parameter that is constantly recalculated based on the accumulated fuel cost. In the minimum power threshold strategy, this parameter is assumed to be constant but may be adjusted externally to maximize fuel economy. A major addition which is not included in the strategy continuum discussed above and which is incorporated in the fuel cost strategy is the use of marginal charging during operation above the power threshold. It should be noted that this charging mode can also be incorporated into the load following portion of the minimum power strategy.

While the invention has been described with reference to vehicles such as automobiles, it is apparent that the invention is easily adapted to other hybrid electric vehicles. It will be understood by those skilled in the art that various changes may be made and equivalents may be substituted for elements of the preferred embodiment without departing from invention. It is accordingly intended that the claims shall cover all such modifications and applications as do not depart from the true spirit and scope of the invention.

What is claimed is:

1. An optimal, adaptive method for controlling energy flow in a hybrid electric vehicle (HEV) having a main power unit (HPU) and a supplementary bi-directional energy storage system (ESS) to satisfy power demand for vehicle propulsion and auxiliary systems and to maintain state of charge (SOC) of said ESS within a selected range while minimizing fuel consumption, comprising the steps of:

making an initial estimate of an equivalent amount of fuel to be associated with energy stored in said ESS;

determining motive demand power (MDP) of said vehicle;

determining an effective power dependent fuel consumption rate for withdrawal of energy from said ESS using known output characteristics of said ESS and the effective fuel value of the energy stored in said ESS;

scanning possible combinations of HPU and ESS output power that satisfy MDP;

selecting the combination of HPU and ESS output power providing the lowest fuel cost, said fuel cost being the sum of HPU fuel consumption and effective ESS fuel consumption;

determining whether the lowest fuel cost combination requires energy from both the HPU and ESS;

satisfying MDP and decrementing the fuel value of ESS energy at a rate proportional to the rate of energy withdrawal when the lowest fuel cost combination requires energy from both the HPU and ESS;

determining whether the ESS should be charged;

operating the HPU at a power level higher than the power demand chosen so as to minimize the fuel cost of energy delivered to and stored in the ESS and incrementing the fuel value associated with energy stored in the ESS at a rate proportional to the rate of fuel usage of the HPU multiplied by the fraction of HPU output diverted to the ESS when the ESS should be charged; and satisfying MDP with the lowest fuel cost combination of HPU and ESS energy and decrementing the fuel value of ESS energy at a rate proportional to the rate of energy withdrawal when the ESS should not be charged.

2. The method of claim 1, including the step of storing regenerative braking energy in the ESS and incrementing the fuel value of energy in the ESS at a rate equivalent to that of ESS charging from the HPU at its peak efficiency.

3. The method of claim 2, including the step of reducing the fuel value of regenerated energy to assure complete consumption of the regenerated energy in future driving.

4. The method of claim 1, wherein the MDP is instantaneous demand power.

5. The method of claim 1, wherein the step of determining MDP includes averaging instantaneous motive power over an integration time period.

6. The method of claim 1, including the step of charging said ESS at a higher than optimal charge rate when SOC is below said selected range.

7. The method of claim 1, including the step of replacing the fuel cost associated with stored energy with a weighted sum thereby allowing adaptive minimization of the weighted total cost of driving the HEV, said weighted sum including costs from a group containing mechanical wear costs and emission costs.

8. The method of claim 7, including the step of varying individual weight of selected components of said weighted sum and determining the fuel economy value of reduction of other components.

9. The method of claim 1, including the step of determining the fuel value of stored energy by estimation or computational means other than storing regenerative braking energy in the ESS and incrementing the fuel value of energy in the ESS at a rate equivalent to that of ESS charging from the HPU at its peak efficiency; reducing the fuel value of regenerated energy to assure complete consumption of the regenerated energy in future driving; replacing the fuel cost associated with stored energy with a weighted sum thereby allowing adaptive minimization of the weighted total cost of driving the HEV wherein said weighted sum includes costs from a group containing mechanical wear costs and emission costs; or varying individual weight of selected components of said weighted sum and determining the fuel economy value of reduction of other components.

10. A near optimal, nonadaptive method for controlling energy flow in a hybrid electric vehicle (HEV) having a main power unit (HPU) and a supplementary bidirectional energy storage system (ESS) to satisfy power demand for vehicle propulsion and auxiliary systems and to maintain state of charge (SOC) of said ESS within a selected range, said method comprising the steps of:

selecting a motive power threshold (MPT);

determining motive power demand (MDP) of said vehicle;

determining whether the ESS SOC is below a critical value lower than a lower end of said selected range for normal operation;

operating the vehicle with the HPU on while charging the ESS at a higher than optimal rate when the ESS SOC is below the critical value;

determining whether the ESS should be charged when the ESS SOC is not below the critical value;

operating the vehicle on energy stored in the ESS alone when the ESS should not be charged;

determining whether MDP is less than MPT when the ESS should be charged and operating the HPU at a constant output power equal to MPT when MDP is less than MPT; and determining whether MDP is less than MPT when the ESS should be charged and operating the HPU in a load following mode where the HPU power is equal to MDP when MDP is not less than MPT.

11. The method of claim 10, wherein the MDP is instantaneous demand power.

12. The method of claim 10, wherein the step of determining MDP includes averaging instantaneous motive power over an integration time period.

13. The method of claim 10, including the step of adjusting MPT for optimal fuel economy under various driving conditions.

14. The method of claim 10, including the step of continuously determining the fuel value of stored energy.

15. The method of claim 10, including the step of determining MPT from the efficiency characteristics of the HPU and ESS, and an external estimate of the fuel value of ESS energy.

16. The method of claim 15, including the step of charging said ESS in a load following mode by operating the HPU at power level higher than the power demand chosen so as to minimize the fuel cost of energy delivered to and stored in the ESS and by incrementing the fuel value associated with energy stored in the ESS at a rate proportional to the rate of fuel usage of the HPU multiplied by the fraction of HPU output diverted to the ESS.

17. The method of claim 10, including the step of determining MPT from the efficiency characteristics of the HPU and ESS, and a running estimate of fuel value of stored energy.

18. The method of claim 10, including the step of charging said ESS in a load following mode by operating the HPU at power level a predetermined amount higher than MDP.

19. The method of claim 10, including the step of minimizing fuel consumption by sweeping the value of MPT over the selected range.

20. The method of claim 10, including the step of adjusting MDP averaging time and MPT and holding HPU cycling frequency and associated restart fuel penalty within predetermined limits.

21. The method of claim 10, including the step of reaching an optimal compromise between fuel economy and HPU cycling frequency by adjusting MDP averaging time and MPT.

* * * * *